United States Patent [19]

Hara

[11] Patent Number: 5,412,399
[45] Date of Patent: May 2, 1995

[54] IMAGE OUTPUT CONTROL APPARATUS

[75] Inventor: Zenichiro Hara, Nagasaki, Japan

[73] Assignee: Mitsubishi Denki Kabushiki Kaisha, Tokyo, Japan

[21] Appl. No.: 655,856

[22] Filed: Feb. 15, 1991

[30] Foreign Application Priority Data

May 23, 1990 [JP] Japan .................. 2-132840

[51] Int. Cl.$^6$ .............................................. G09G 1/00
[52] U.S. Cl. ..................................... 345/113; 345/118; 345/201
[58] Field of Search ............... 340/721, 723, 728, 734, 340/798, 799, 747, 750; 358/241; 345/112, 113, 114, 115, 116, 117, 118, 119, 201

[56] References Cited

U.S. PATENT DOCUMENTS

| | | | |
|---|---|---|---|
| 4,642,621 | 2/1987 | Nemoto et al. | 340/721 |
| 4,675,737 | 6/1987 | Fujino et al. | 340/721 |
| 4,682,297 | 7/1987 | Iwami | 340/721 |
| 4,710,767 | 12/1987 | Sciacero et al. | 340/799 |
| 4,780,710 | 10/1988 | Tatsumi | 340/721 |
| 4,800,376 | 1/1989 | Suga et al. | 340/721 |
| 4,833,542 | 5/1989 | Hara et al. | 358/241 |
| 4,857,905 | 8/1989 | Ogawa | 340/750 |
| 4,862,154 | 8/1989 | Gonzalez-Lopez | 340/799 |
| 4,876,533 | 10/1989 | Barkans | 340/721 |
| 4,965,751 | 10/1990 | Thayer et al. | 340/723 |
| 5,001,469 | 3/1991 | Pappas et al. | 340/721 |

FOREIGN PATENT DOCUMENTS

| | | |
|---|---|---|
| 56-4185 | 1/1981 | Japan . |
| 60-136828 | 7/1985 | Japan . |
| 61-5339 | 1/1986 | Japan . |
| 62-20079 | 1/1987 | Japan . |
| 63-29838 | 2/1988 | Japan . |

Primary Examiner—Richard Hjerpe
Assistant Examiner—Steven J. Saras
Attorney, Agent, or Firm—Burns, Doane, Swecker & Mathis

[57] ABSTRACT

Disclosed is an image output control apparatus which preferentially outputs video data onto a bus by use of a video priority signal and, if digital data representing characters and graphics includes data corresponding to any transparent pixel, outputs the video data onto the bus. This apparatus implements various displays of image composition involving video and digital data and ensures instantaneous transition between screens without disturbing the display.

16 Claims, 15 Drawing Sheets

IMAGE OUTPUT CONTROL APPARATUS

BACKGROUND OF THE INVENTION

1. Field of the Invention

The present invention relates to an image output control apparatus and, more particularly, to an image output control apparatus which superimposes a video image onto such digitally generated types of image as characters and graphics and outputs the superimposed image to a display unit such as a large-screen display.

2. Description of the Prior Art

FIG. 1 is a block diagram of the prior art signal processor disclosed in Japanese Patent Laid-open No. 56-4185, the signal processor being used by display units. In FIG. 1 the signal processor comprises a down counter 1, flip-flop circuit 2, pixel 3, a group of video signal lines 4, a clock pulse input line 5, and a set pulse signal input line 6.

As shown in FIG. 2, many of these parts are arranged in a matrix pattern to constitute one display unit 29. In FIG. 2, reference numeral 8 refers to an A/D converter, and 9 refers to a timing generating circuit. As depicted in FIG. 3, modules 28 are each constituted by a predetermined number of pixels. Data is individually transmitted to each module 28. In FIG. 3, reference numeral 11 designates a group of buffers for waveform shaping purposes, and 12 denotes a group of terminators.

In operation, the effective interval of a video image is converted by the A/D converter 8 into a digital signal containing a predetermined number of bits (six bits per sample hereinafter). In accordance with a timing signal generated by the timing generating circuit 9, the digital signal is sampled for the data corresponding to the number of pixels in the screen (display unit) 29. Particularly on a large-screen display unit, a screen of a desired size may be formed by providing a suitable number of modules 28; sampling is carried out based on the screen size. The sampled data is transmitted over a bus 13 to each buffer memory 10 for temporary storage. The buffer memories 10 convert the data from the bus 13 into data having a lower speed before transmission to each module 28. FIG. 4 is a conceptual view of how the transmission speed is converted by the buffer memories 10. For example, an effective signal of one scanning line (1H) is divided into three parts (H$_1$, H$_2$ and H$_3$ in FIG. 4). The divided signals H$_1$, H$_2$ and H$_3$ are stored temporarily in the buffer memories 10 during periods W$_1$, W$_2$ and W$_3$, respectively. The writing of the three signals to the buffer memories 10 is performed after periods P$_1$, P$_2$ and P$_3$ elapse, respectively, following the completion of writing signals H$_1$, H$_2$ and H$_3$ of the preceding scanning line. That is, the read periods P$_1$, P$_2$ and P$_3$ are fixed relative to the write periods W$_1$, W$_2$ and W$_3$, respectively. Whereas the bus 13 is a high-speed bus through which A/D converted video image signals pass, a second bus 14 is a bus that carries data having the lower data transmission speed. This means that a flat cable may be used as bus 14. For the second bus 14, each buffer memory 10 designates a start address to carry out successive data transmission. The modules 28 receive appropriate data based on these addresses. The data is stored element in a data storage 7 corresponding to each pixel.

FIG. 1 illustrates an example in which the preset part of the down counter 1 is utilized as the data storage element 7. The moment a set signal turns on the flip-flop circuit; 2, six-bit video data is loaded into the down counter 1. Immediately thereafter, the down counter 1 counts clock pulses and outputs a borrow signal at the point in time which corresponds to the loaded data. It is at this point that the flip-flop circuit 2 is turned off and the down counter 1 ends its counting. Depending on the data, the flip-flop circuit 2 is turned on in up to 64 steps to drive the pixel. The above process is repeated, with the data of each pixel updated per field (1/60 sec. for NTSC) in synchronization with the video data. In this manner, an image of up to 64 grades is displayed on the screen.

On the display unit 29 (especially on a large-screen display), a number of display functions are required in addition to the video image display feature. For example, it is sometimes desirable to superimpose characters and graphics onto the video image. The superimposing takes place on the bus 13.

FIG. 5 is a block diagram of the prior art image output control apparatus illustratively disclosed in Japanese Patent laid-open Application No. 60-136828. In FIG. 5 the image control apparatus comprises, a first memory 15 for storing A/D converted video data in units of fields or frames, an I/O device 16 that inputs characters and generates graphic images, a CPU 17 that controls image generation and display, a program memory 18 that stores programs, a disk unit 19 that stores digital data representing characters and graphic images on disk, a disk controller 20 that controls data input and output to and from the disk unit 19, a control bus 21 for transferring data between the CPU 17 and other parts of the system, a DMA bus 22 for transferring the digital data, and a second memory 23 that contains the digital data in units of fields or frames. Data is output from the first memory 15 and the second memory 23 by either of the control circuits shown in FIGS. 7 or 8 and connected thereto. These control circuits are omitted in FIG. 5 so as to simplify the illustration.

In operation, an input video image is converted by the A/D converter 8 into video data which is a digital signal. The video data is placed into the first memory 15. For example, the video data representing the image shown in FIG. 6(a) is stored into the first memory 15. On the other hand, digital data representing the image shown in FIG. 6(b) is generated by the I/O device 16 and the CPU 17. This digital data is written to the disk unit 19. Under control of the CPU 17, the digital data in the disk unit 19 is placed onto the DMA bus 22 via the disk controller 20. The digital data is then stored into the second memory 23 in units of fields or frames. The video data in the first memory 15 and the digital data in the second memory 23 are read therefrom in accordance with a common timing signal, the two kinds of data being output onto the bus 13. This generates composite data representing a composite image as depicted in FIG. 6 (C).

Block 25 represents a converter for converting the data on the bus 13 to television signals and screen symbol 26 denotes a monitor television. The image data synthesized on the bus 13 are displayed at a large-scale display and the displayed contents can be ascertained by the monitor television.

There are two ways to generate composite data. The first way is to have the bus controller 24 tell the first memory 15 and the second memory 23 (using a timing signal) to place their data onto the bus 13 with an appropriate timing which takes the display area of the screen into account. A typical setup implementing this scheme of composite data generation is illustrated in FIG. 8. In FIG. 8, video data generating block 31 comprises the first memory 15, a timing controller 32 and a bus buffer 33. The timing controller 32 receives the timing signal from the bus controller 24 over a timing signal line 13b and tells the first memory 15 to output its data accordingly. The bus buffer 33, using an enable signal (VEN) 34 from the bus controller 24, sends the video data to a data bus 13a of the bus 13. Digital data generating block 35 comprises the second memory 23, a timing controller 36 and a bus buffer 37. The timing controller 36 receives the timing signal from the bus controller 24 and tells the second memory 23 accordingly to output its data. The bus buffer 37, using an enable signal (DEN) 38 from the bus controller 24, transfers the digital data to the data bus 13a of the bus 13. In this manner, the bus controller 24 selectively outputs VEN 34 or DEN 38.

The second way to generate composite data is a scheme in which the bus controller 24 does not output VEN 34 or DEN 38 but determines the priority according to which the video data generating block 31 and the digital data generating block 35 use the data bus 13a. FIG. 7 shows a construction illustrative of this scheme. In FIG. 7, the circuit comprises the video data generating block 31, and the digital data generating block 35 which contains a transparency discriminating circuit 40 and an inverting gate 41. The transparency discriminating circuit 40 checks to see if each pixel of the digital data from the second memory 23 is transparent. The inverting gate 41 inverts the output from the transparency discriminating circuit 40 and supplies the result to the bus buffer 33 of the video data generating block 31. Therefore, when a timing signal is output by the bus controller 24, the second memory 23 is given priority and outputs digital data onto the data bus 13a. If a pixel of the digital data is transparent, the corresponding video data is output from the first memory 15 onto the data bus 13a. In this manner, the video data or digital data is selectively output onto the data bus 13a depending on the digital data content. Composite data is placed onto the data bus 13a in one of the above-described two ways. As a result, a composite image like the one shown in FIG. 6 (C) is displayed on the screen.

Where a large-screen display unit is used, the bus 13 is connected to a plurality of buffer memories 10 according to screen size, as illustrated in FIG. 3. Appropriate data is sent to each module 28, and the target image is displayed on the screen.

A case is assumed in which the images shown in FIG. 9 are displayed. FIG. 9 (A) shows how a video image is superimposed onto a certain portion of a digital image (which is not transparent). This superimposing process can be implemented using the above-described first scheme, i.e., the construction shown in FIG. 8. In this scheme, the bus controller 24 suitably controls VEN 34 and DEN 38. The superimposing process can also be implemented using the second scheme, i.e., the construction depicted in FIG. 7. This is made possible because the video data is output for that portion of the digital data which contains transparent pixels.

FIG. 9 (B) shows a case in which a video image is displayed in a certain area of a digital image, followed by another display of the initial digital image. This superimposing process is implemented using the first scheme. This is made possible because the bus controller 24 suitably controls VEN 34 and DEN 38. However, the second scheme cannot be used because it is a scheme that superimposes a digital image onto a video image. Under this scheme, it is impossible not to display that portion of the digital data which contains untransparent pixels. If the second scheme must be used, a separate frame memory most be provided so that the data representing the composite image may be stored therein. Upon completion of the display, the initial digital data needs to be written again to the frame memory. This means that while data is being written to the frame memory upon display switch, there occurs an awkward transition between display modes on the display screen.

FIG. 9 (C) shows a case in which a character digital image is superimposed onto a video image. This superimposing process is implemented using the second scheme but not the first scheme. The reason for this is that under the first scheme, the bus controller 24 would have to control VEN 34 and DEN 38 for each pixel of the font of characters to be displayed; the bus controller 24 does not have provisions for fonts and is incapable of providing control of the above kind.

Given the above-described structure, the prior art image output control apparatus has a number of disadvantages, one of which is its inability to implement the superimposing of a plurality of images into a composite image. With its construction in FIG. 8, the apparatus is incapable of superimposing characters onto a video image; with its construction in FIG. 7, the apparatus cannot superimpose a desired video image onto a digital image.

Another disadvantage of the prior art apparatus is that where a large-screen display is used, the apparatus often has difficulty in implementing a plurality of screens as shown in FIG. 10.

FIGS. 10 (A)–10 (D) illustrate examples in which one or a plurality of screens 29a–29c are displayed on the single display unit 29, each screen containing a composite image made of a video image 291 and a digital image 292.

SUMMARY OF THE INVENTION

It is therefore an object of the present invention to overcome the above-described drawbacks and disadvantages and to provide an image output control apparatus which implements the function of superimposing a plurality of images into a composite image, eliminates awkward transitions between display modes, and displays a plurality of images on a single screen suitable for a large-screen display unit.

In achieving the foregoing and other objects of the present invention and according to a first aspect thereof, there is provided an image output control apparatus comprising: a bus through which data passes representing an image displayed on the screen of a display unit connected to the bus, a video data generating block for generating video data which is digitized data of a video image displayed on the display unit, a digital data generating block for generating digital data which is digitized data of a character or graphic image displayed on the display unit, and a video priority signal generating circuit for outputting a video priority signal designating that video data be preferentially output onto the bus; the video data generating block further comprising an area generating circuit for outputting an area designation signal designating the area in which to display a video image on the display unit, a digital data inhibit signal generating circuit for generating a digital data inhibit signal in accordance with the area designation signal and video priority signal, and a first inhibit circuit for inhibiting video data from being output onto the bus upon receipt of a second inhibit signal; the digital data generating block further comprising a transparency discriminating circuit for generating a transparency signal when detecting the digital data indicating a transparent pixel, an inhibit signal generating circuit for generating a first and a second inhibit signal in accordance with the digital data inhibit signal and the transparency signal, and a second inhibit circuit for inhibiting digital data from being output onto the bus upon receipt of the first inhibit signal.

According to a second aspect of the invention, there is provided an image output control apparatus wherein the above-mentioned components are contained in each of a plurality of data output circuits, the apparatus further comprising a priority discriminating circuit for selecting one of the plurality of data output circuits and allowing it to output data onto the bus.

According to a third aspect of -the invention, there is provided an image output control apparatus wherein the video priority signal generating circuit is adapted to output video data onto the bus in preference to digital data even if the digital data contains an untransparent pixel.

According to a fourth aspect of the invention, there is provided an image output control apparatus wherein the priority discriminating circuit supplies an enable signal to one of the plurality of data output circuits and allows it to output data onto the bus.

DETAILED DESCRIPTION OF THE PREFERRED EMBODIMENTS

Figure 7:
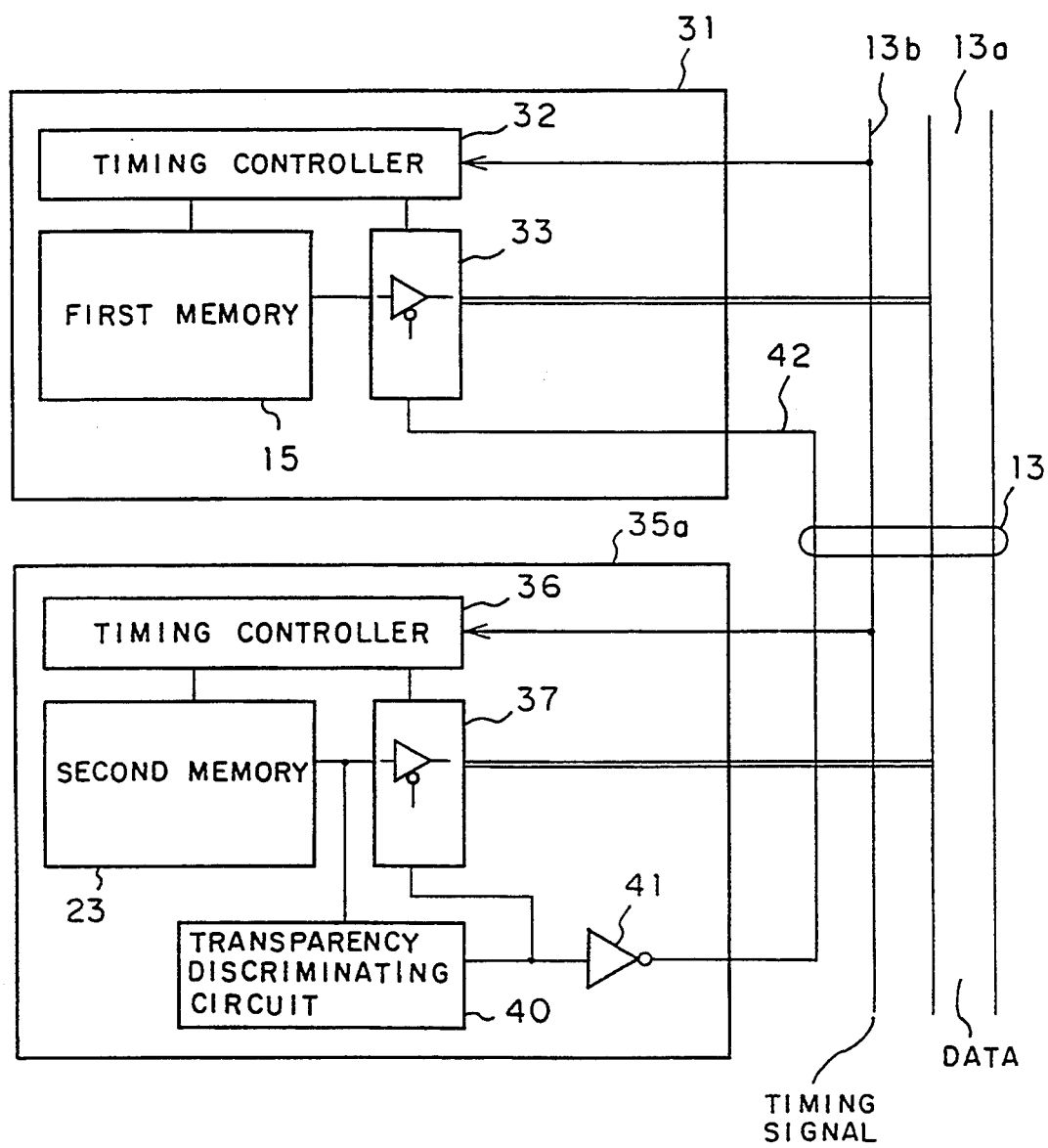
FIGS. 7 and 8 are block diagrams of prior art data output circuits.
Figure 8:
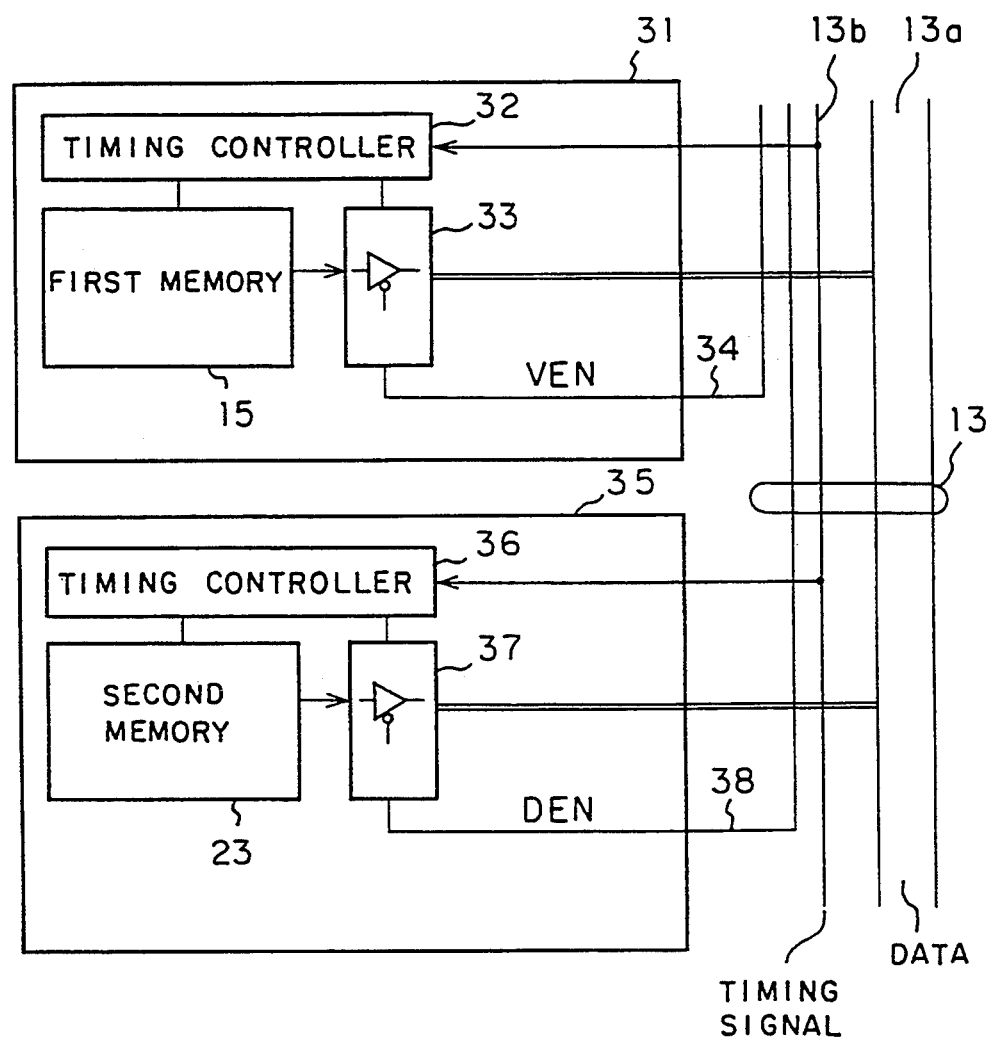
Figure 11:
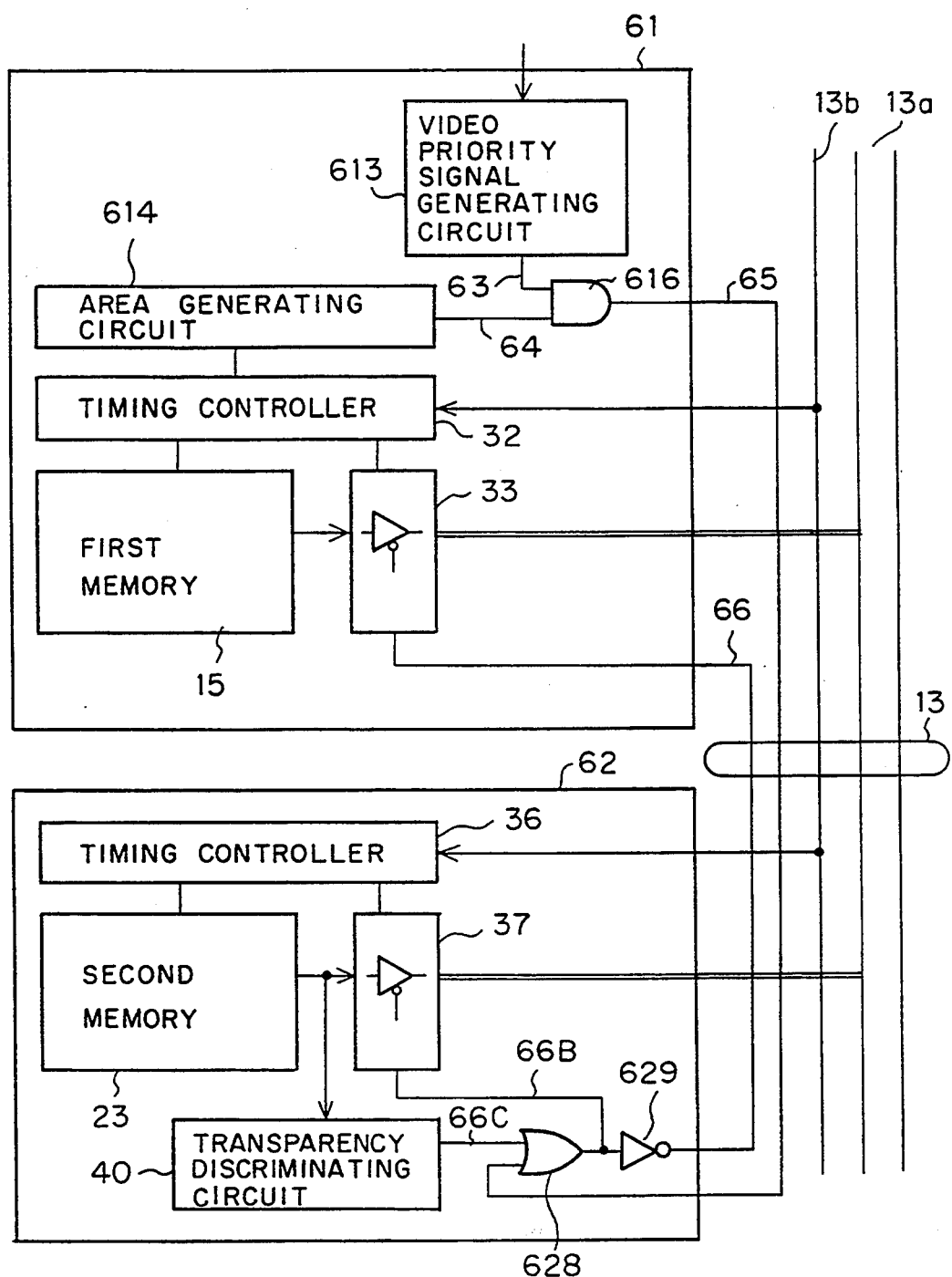
FIG. 11 is a block diagram of a first embodiment of the invention in the form of an image output control apparatus.

Preferred embodiments of the present invention will now be described with reference to the accompanying drawings. FIG. 11 is a block diagram illustrating the first embodiment of the invention. In FIG. 11, a video data generating block 61 comprises a video priority signal generating circuit 613 that outputs a video priority signal 63, an area generating circuit 614 that outputs an area enable signal (area designation signal) 64, and an AND gate 616 that outputs a digital data inhibit signal 65. A digital data generating block 62 comprises an OR gate 628 that receives a digital data inhibit signal 65 and the output from a transparency discriminating circuit 40, and an inverting gate 629 that inverts the output from the OR gate 628 and outposts the result as a second inhibit signal 66. Of the other parts in FIG. 11, those also shown in FIG. 7 are designated by like reference numerals. A bus buffer 33 constitutes a first inhibit circuit and a bus buffer 37 a second inhibit circuit.

Figure 12:
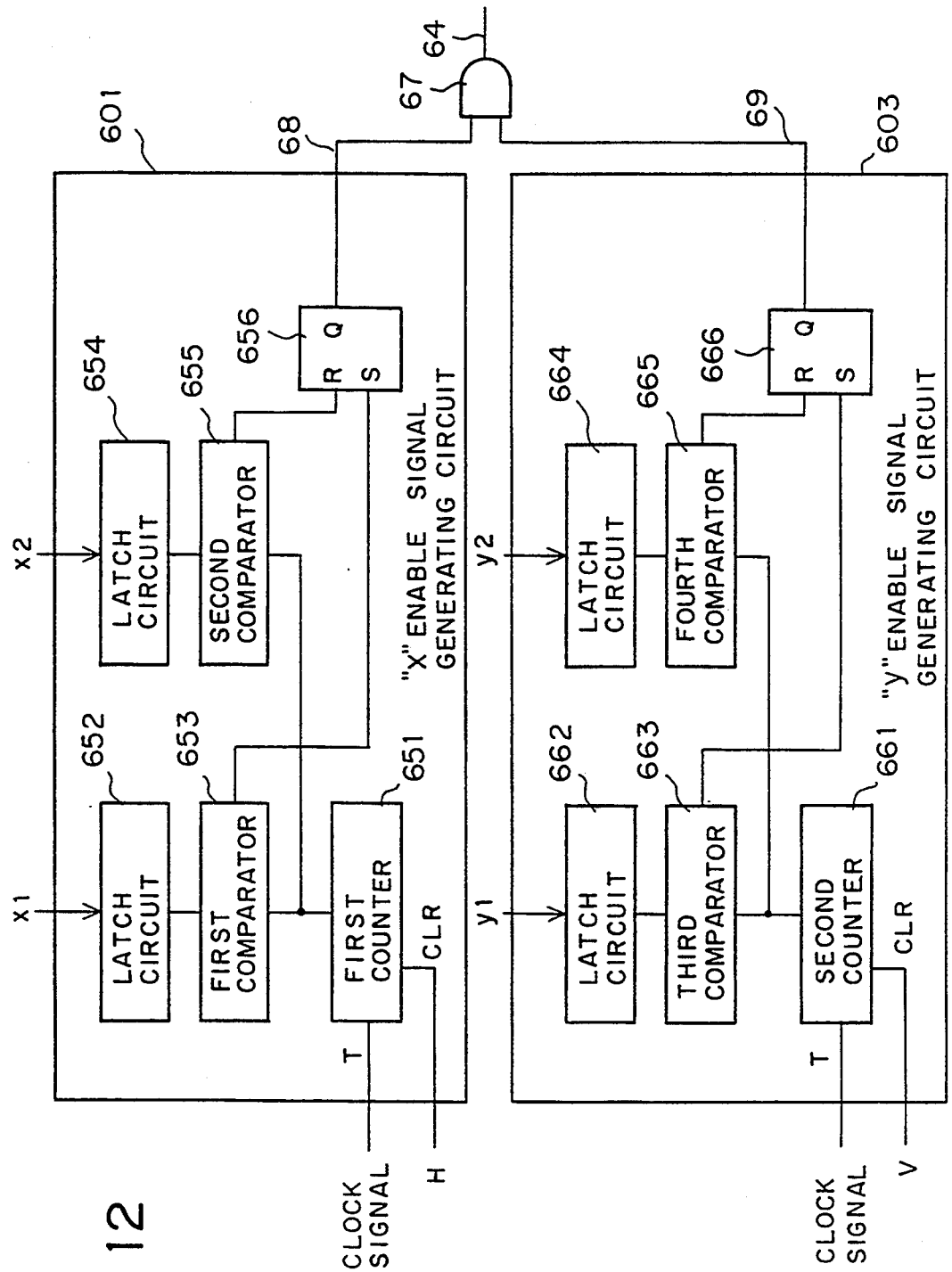
FIG. 12 is a block diagram of an area generating circuit contained in the first embodiment.

FIG. 12 is a block diagram illustrating how the area generating circuit 614 is constructed. In FIG. 12, an "x" enable signal generating circuit 601 generates a horizontal enable signal (i.e., "x" enable signal) 68. The "x" enable signal generating circuit 601 comprises a first counter 651 that counts clock signals corresponding to pixels, a latch circuit 652 that has a parameter x1 set thereto, a first comparator 653 that compares the count value with the parameter x1, a latch circuit 654 that has a parameter x2 set thereto, a second comparator 655 that compares the count value with the parameter x2, and a flip-flop circuit 656 that is set or reset by the two comparators 653 and 655. A "y" enable signal generating circuit 603 is the same in construction as the "x" enable signal generating circuit 601. The "y" enable signal generating circuit 603 comprises a second counter 661, a third comparator 663, a latch circuit. 662 that has a parameter y1 set thereto, a latch circuit 664 that has a parameter y2 set thereto, a fourth comparator 665, and a flip-flop circuit 666. An AND gate 67 receives the "x" enable signal 68 and a "y" enable signal 69 to generate the area enable signal 64.

Figure 13:
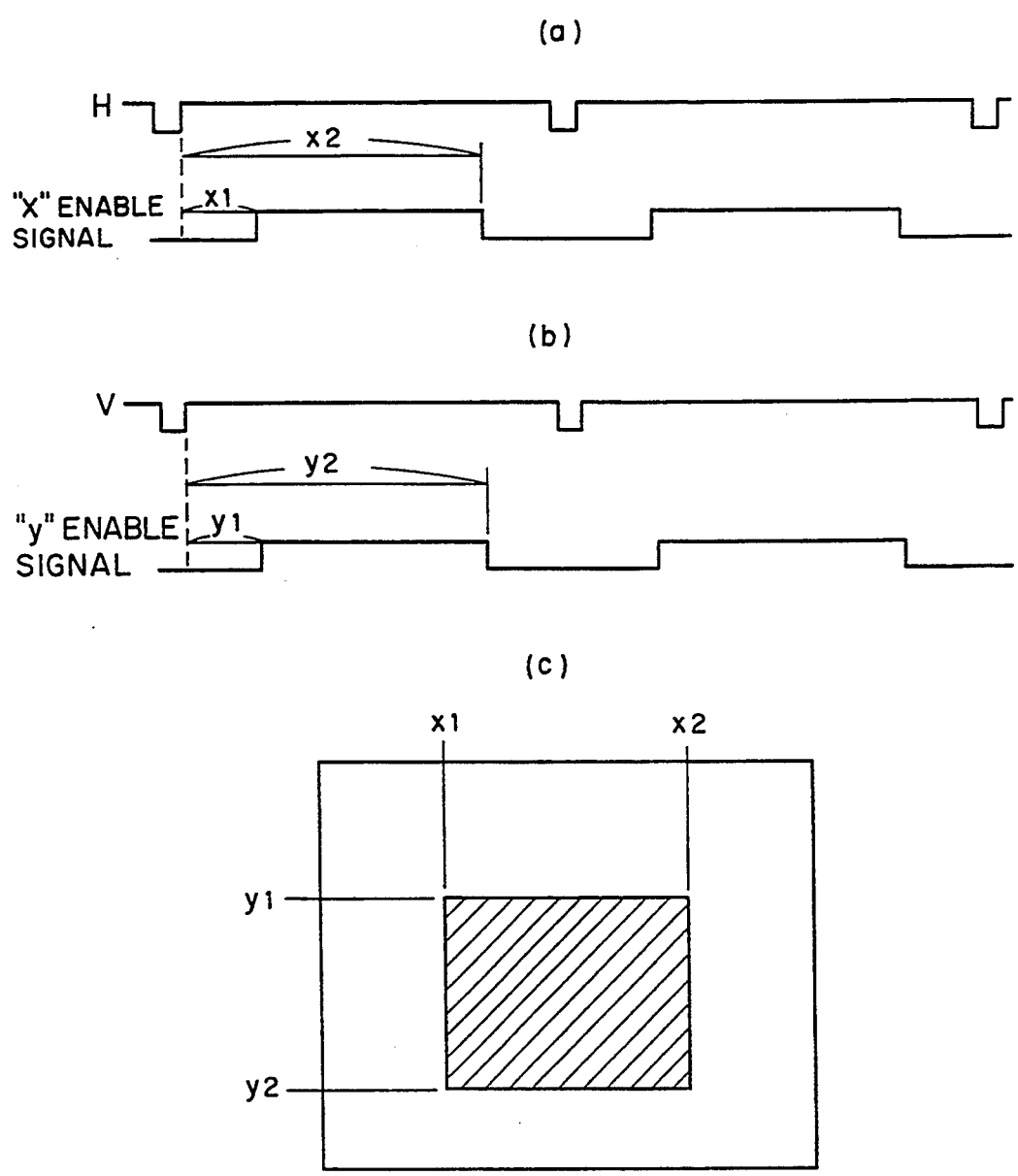
FIG. 13 is a set of views describing how an "x" enable signal and a "y" enable signal behave in connection with the first embodiment.

How the first embodiment works will now be described. The parameters x1, x2, y1 and y2 representing the display areas of the screen are set to the latch circuits 652, 654, 662 and 664, respectively, in the area generating circuit 614. The counter 651 is reset by a horizontal synchronizing signal H, and starts counting clock signals corresponding to pixels. The comparator 653 or 655 outputs a coincidence signal when the count value coincides with x1 or x2, respectively. As a result of this, the "x" enable signal 68, which is the output of the flip-flop circuit 656, behaves as depicted in FIG. 13 (A). Likewise the "y" enable signal 69, which is the output of the flip-flop circuit 666, behaves as illustrated in FIG. 13 (B). Upon receipt of the "x" enable signal 68 and "y" enable signal 69, the AND gate 67 generates the area enable signal 64. As shown in FIG. 13 (C), the area enable signal designates a certain area of the screen defined by the parameters x1, x2, y1 and y2.

The video priority signal generating circuit 613 outputs the video priority signal 63 which causes video data to be output preferentially. The period during which the video priority signal is output is determined in advance. The video priority signal generating circuit 613 may be implemented by use of a construction similar to that of the area generating circuit 614. The AND gate 616 outputs the digital data inhibit signal 65 when the area enable signal 64 and the video priority signal 63 are both set to 1. The digital data inhibit signal 65 becomes a first inhibit signal 66B after passing through the OR gate 628, inhibiting the bus buffer 37 from effecting its output. Thus the output of the video priority signal 63 inhibits the second memory 23 from outputting digital data onto the data bus 13a. The output from the OR gate 628 causes the inverting gate 629 to invert the digital data inhibit signal 65 so as to produce the second inhibit signal 66. The second inhibit signal 66 is inactive (i.e., set to 1) and places the bus buffer 33 in a conductive state. This in turn causes the first memory 15 to output its video data onto the data bus 13a. With the video priority signal 63 output as per the desired timing, the superimposing of images in FIG. 9 (B) becomes possible.

If the video priority signal is set to 0, the bus buffers 33 and 37 are controlled by the output (transparency signal 66c) from the transparency discriminating circuit 40, as with the prior art setup of FIG. 7. Thus if the digital data output from the second memory 23 contains a transparent pixel, the video data in the first memory 15 is output onto the data bus 13a; if the digital data contains no transparent pixel, the digital data is output onto the data bus 13a. This makes it possible to superimpose the digital image onto the video image, as illustrated in FIG. 9 (C).

Figure 9:
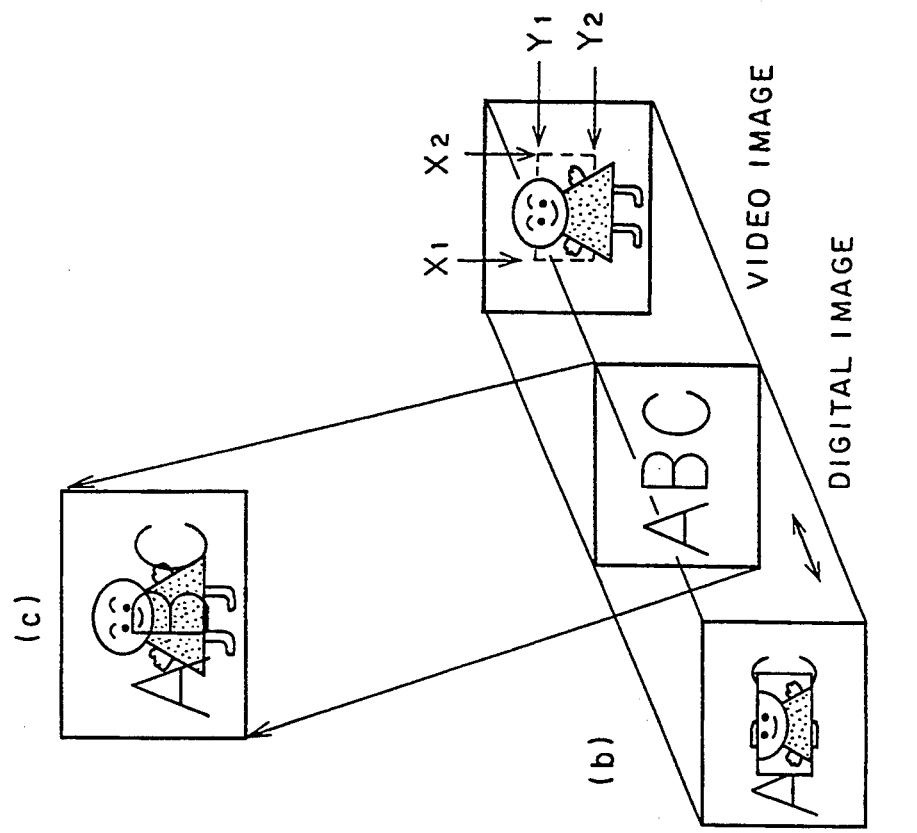
FIG. 9 is a set of views depicting examples of image composition.

In this manner, various display modes depicted in FIG. 9 are implemented. Transition from screen to screen is carried out instantaneously without the video priority command disturbing the display. Since the parameters x1, x2, y1 and y2 are set as desired, varieties of display are made available.

Figure 1:
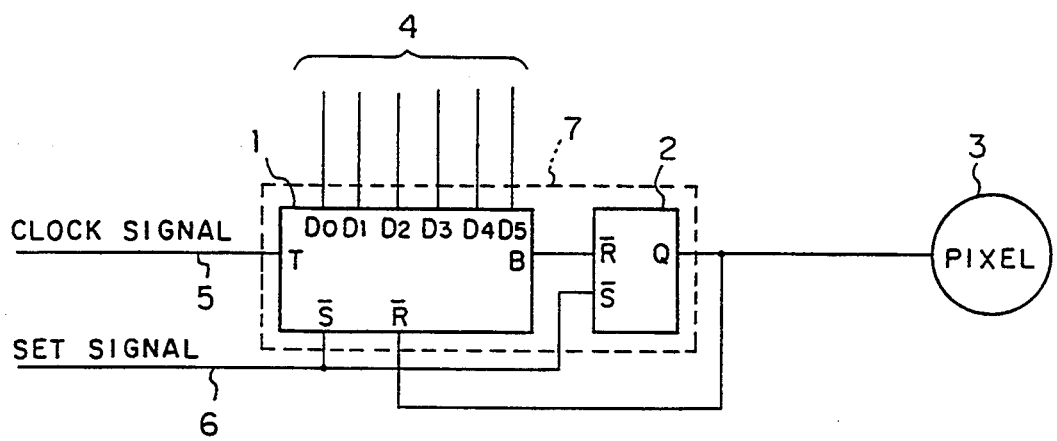
FIG. 1 is a block diagram of a prior art signal processor for use with a display unit.
Figure 2:
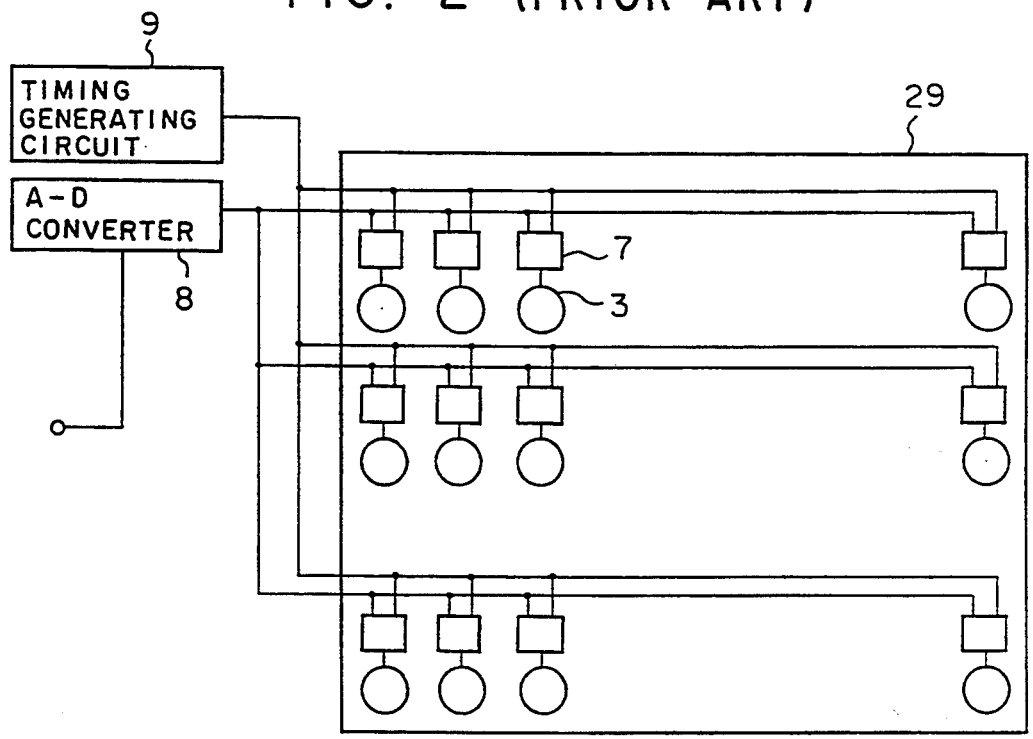
FIG. 2 is a block diagram of a prior art display unit and its typical peripheral circuits.
Figure 3:
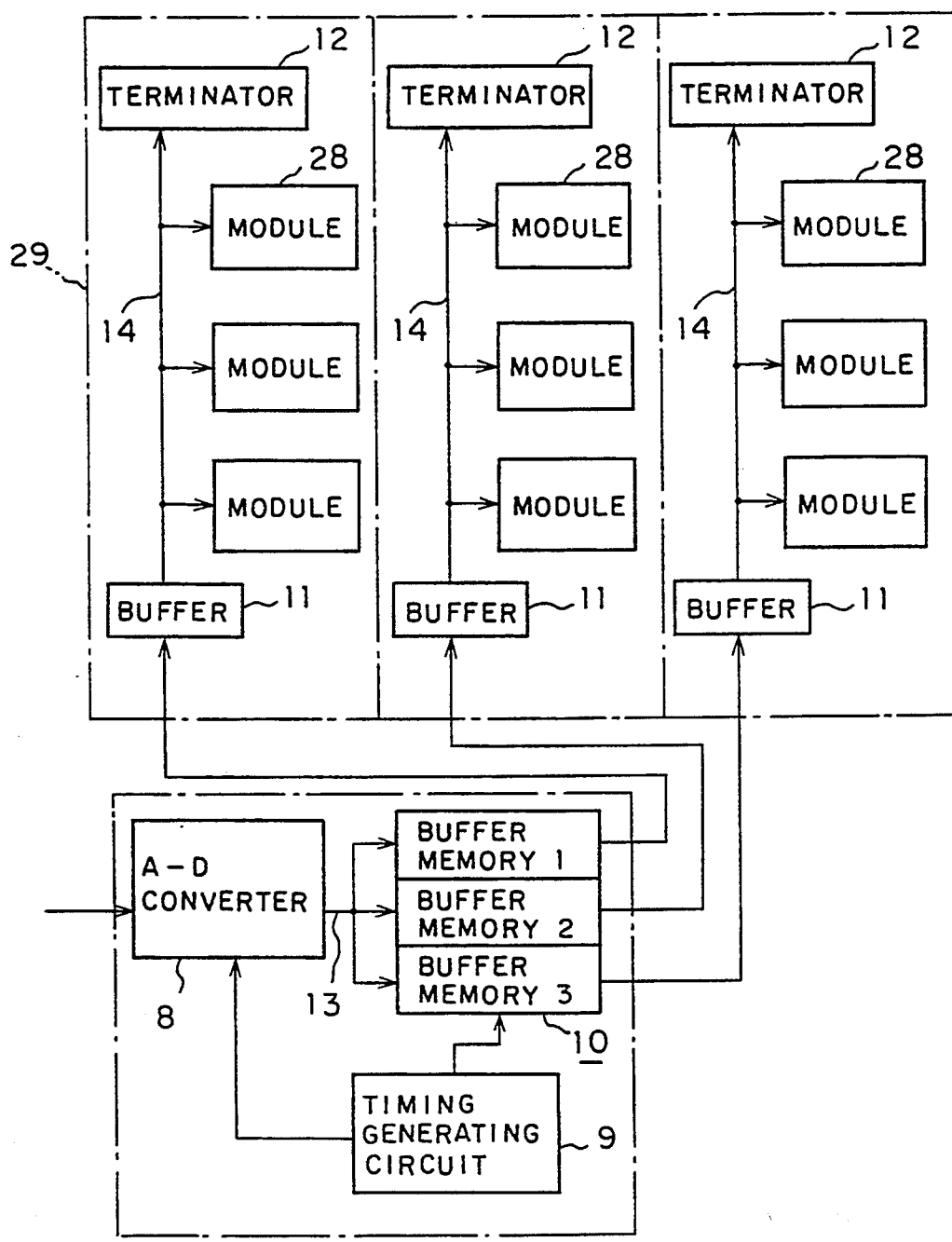
FIG. 3 is a block diagram of a prior art large-screen display unit and its typical peripheral circuits.
Figure 4:
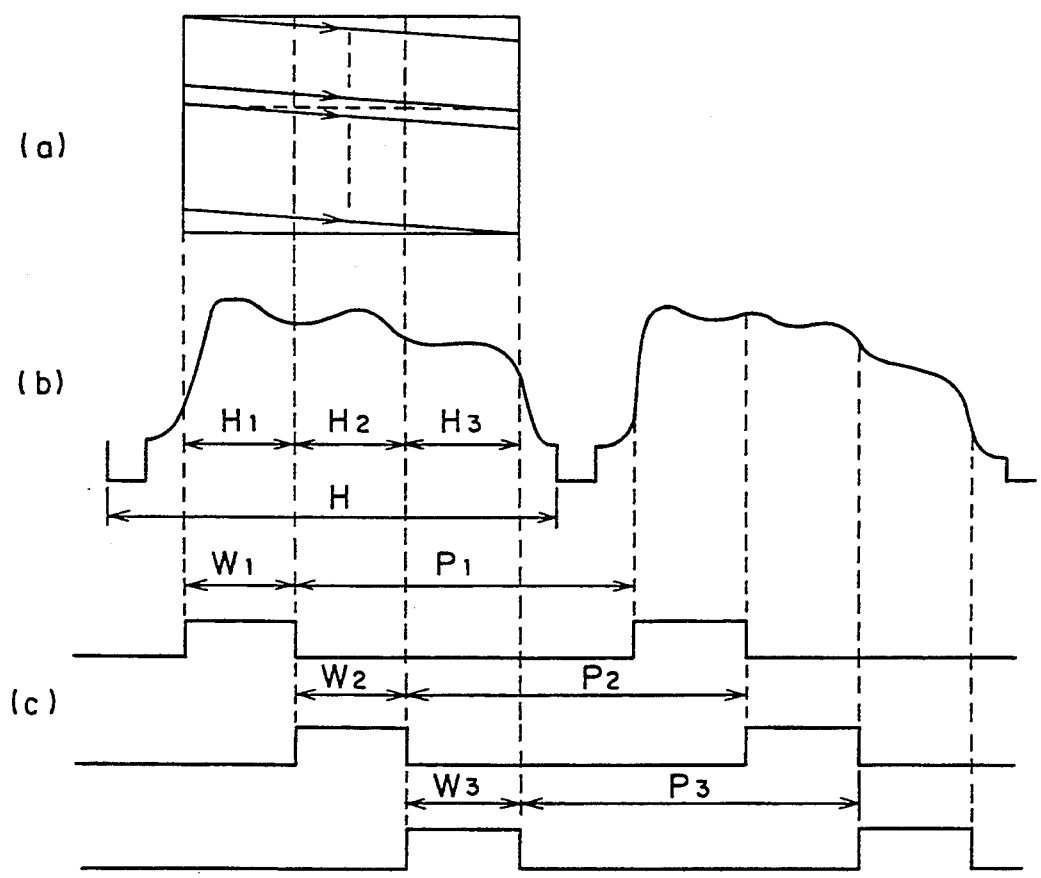
FIG. 4 is a conceptual view of how data speeds are converted in a prior art buffer memory arrangement.
Figure 5:
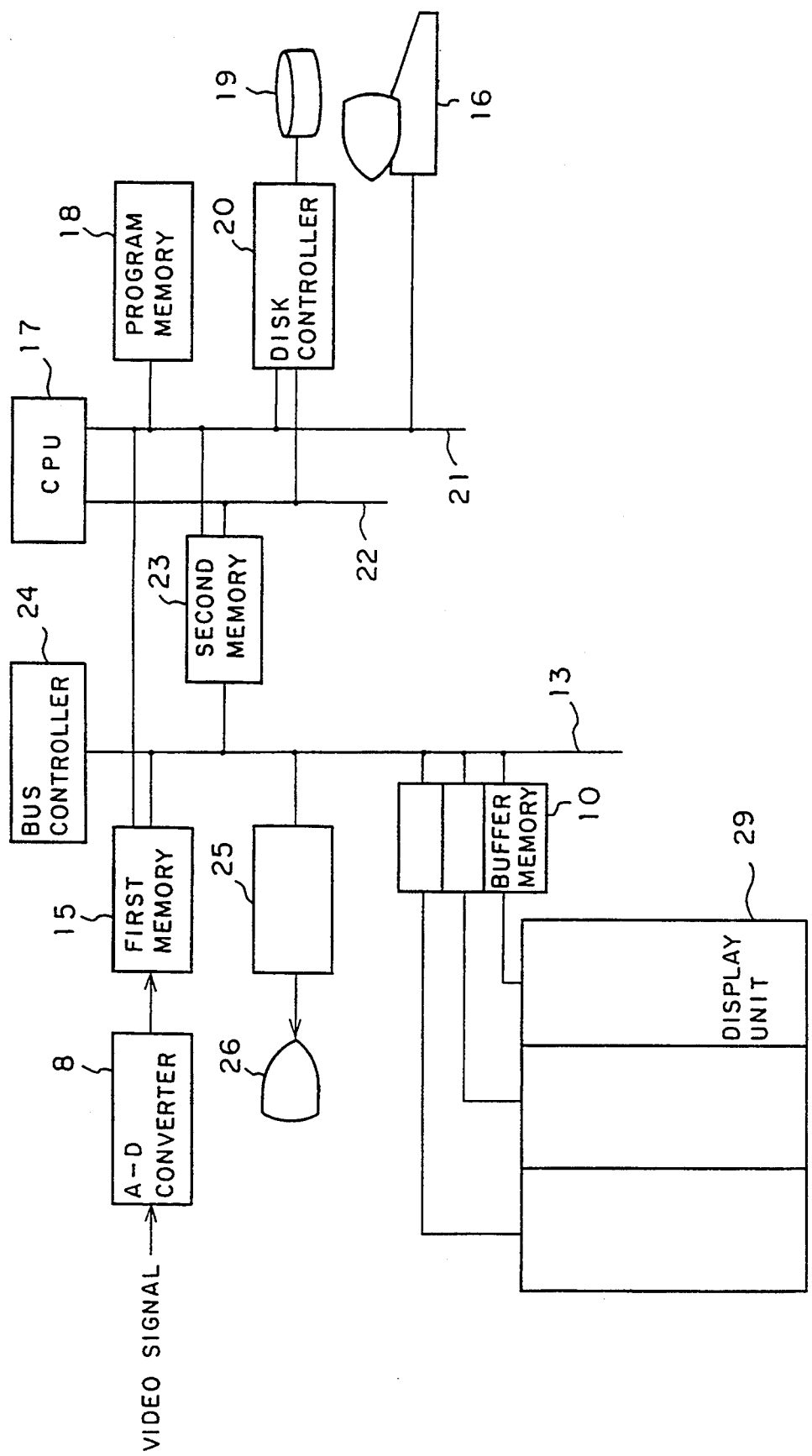
FIG. 5 is a block diagram of a prior art image output control apparatus along with its typical display unit.
Figure 6:
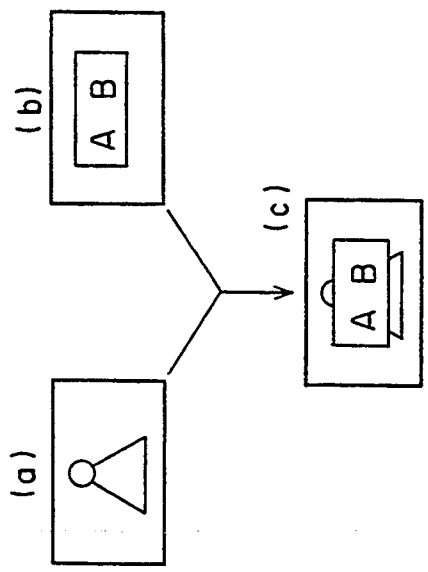
FIG. 6 is a view describing an example of image composition.
Figure 14:
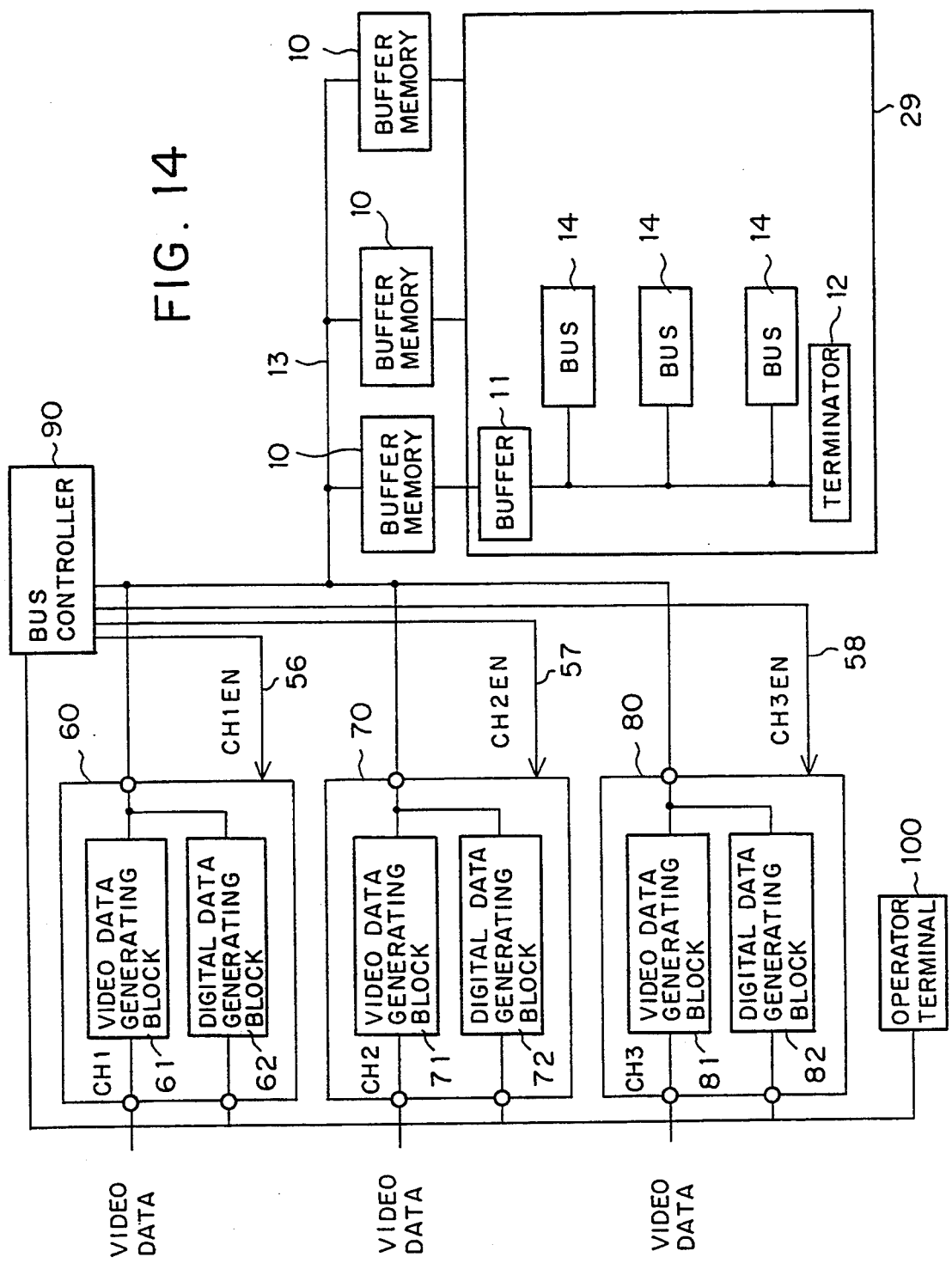
FIG. 14 is a block diagram of a second embodiment of the invention in the form of an image output control apparatus coupled with a display unit.

The second embodiment of the invention will now be described. In FIG. 14, data output circuits 60, 70 and 80 comprise video data generating blocks 61, 71 and 81 and digital data generating blocks 62, 72 and 82, respectively. A bus controller 90 determines which of the data output circuits 60, 70 and 80 is to output data onto the bus 13. An operator terminal 100 generates digital data or designates display areas under operator control. Of the other parts in FIG. 14, those also shown in FIG. 3 are designated by like reference numerals. In FIG. 14, the bus controller 90 constitutes a typical priority discriminating means.

Figure 15:
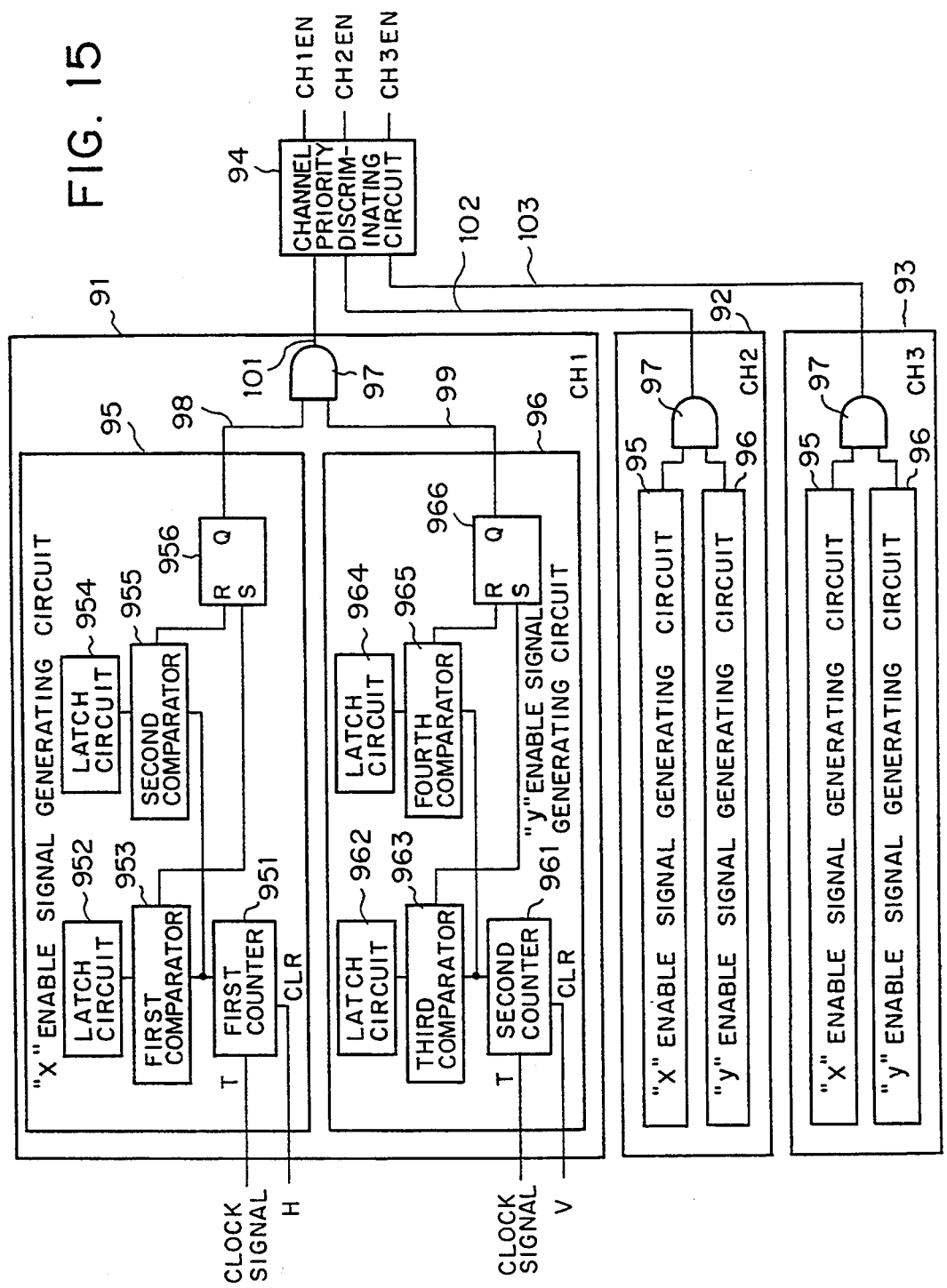
FIG. 15 is a block diagram of major components of a bus controller used in the second embodiment.

FIG. 15 is a block diagram illustrating those parts in the bus controller 90 which determine channel priority. In FIG. 15, channel area generating circuits 91, 92 and 93 correspond to the data output circuits 60, 70 and 80, respectively. The channel area generating circuits 60, 70 and 80 each comprise an "x" enable signal generating circuit 95 that generates a horizontal enable signal (i.e., "x" enable signal) 98, a "y" enable signal generating circuit 96 that generates a vertical enable signal (i.e., "y" enable signal) 99, and an AND circuit 97 that outputs channel area designation signals 101, 102 and 103. The "x" enable signal generating circuit 95 contains a first counter 951 that counts clock signals corresponding to pixels, a latch circuit 952 that has the parameter x1 set thereto, a first comparator 953 that compares the count value with the parameter x1, a latch circuit 954 that has the parameter x2 set thereto, a second comparator 955 that compares the count value with the parameter x2, and a flip-flop circuit 956 that is set or reset by the two comparators 953 and 955. The "y" enable signal generating circuit 96 is the same in construction as the "x" enable signal generating circuit 95, comprising a second counter 961, a third comparator 963, a latch circuit 962 that has the parameter y1 set thereto, a latch circuit 964 that has the parameter y2 set thereto, a fourth comparator 965, and a flip-flop circuit 966.

Figure 16:
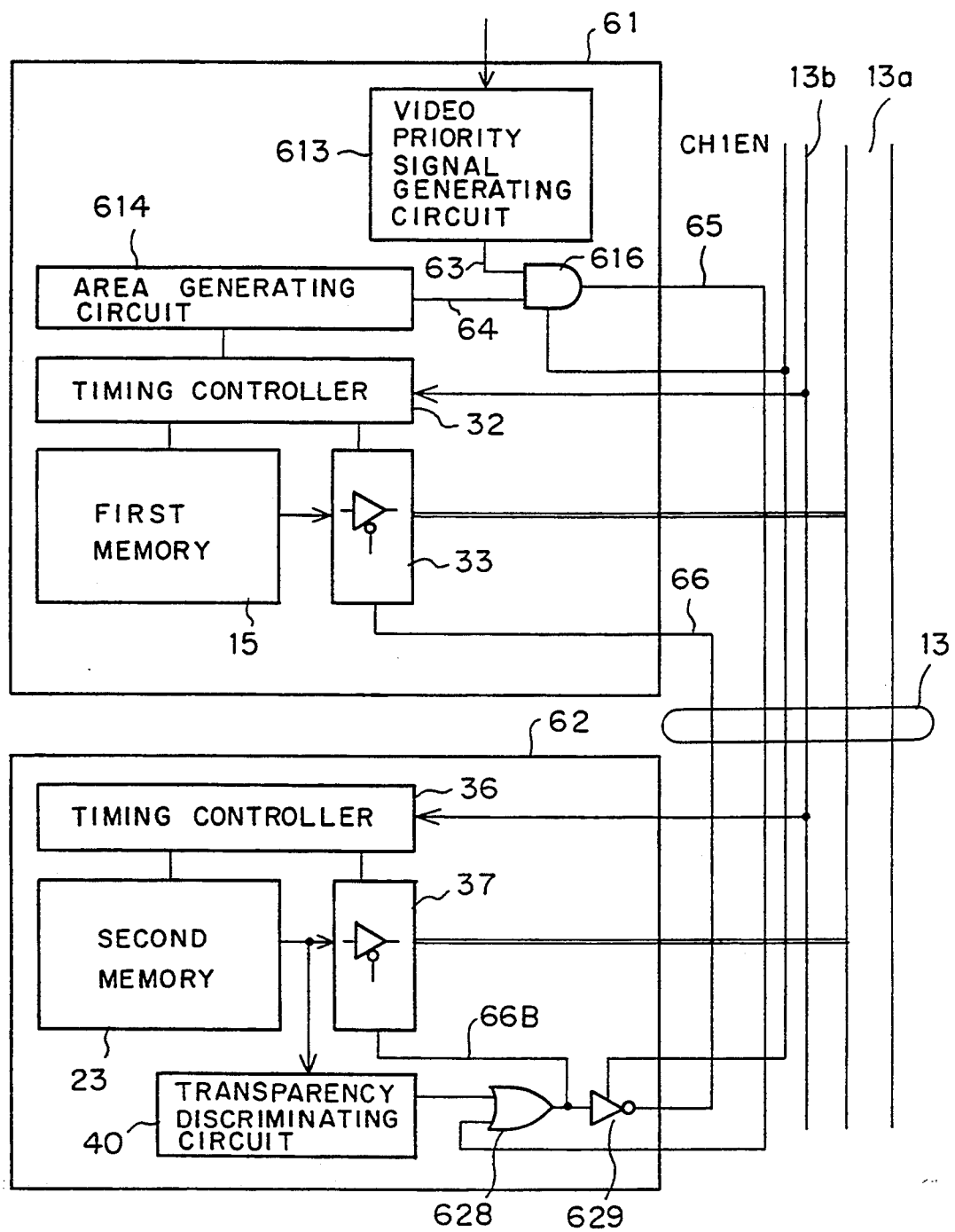
FIG. 16 is a block diagram of a data output circuit used in the second embodiment.

FIG. 16 is a block diagram depicting the construction of the data output circuit 60. The construction is the same as what is illustrated in FIG. 11, except that the AND gate 616 and the inverting gate 629 are a three-state gate each.

The other data output circuits 70 and 80 are also the same in construction as that shown in FIG. 16.

How the second embodiment works will now be described. The parameters x1, x2, y1 and y2 representing the display areas corresponding to data-carrying channels are set illustratively from the operator terminal 100 to the latch circuits 952, 954, 962 and 964, respectively, in the channel area generating circuits 91, 92 and 93. A first channel CH1, a second channel CH2 and a third channel CH3 correspond to the display areas in which the data output circuits 60, 70 and 80 are to display images, respectively. In the channel area generating circuits 91, 92 and 93 shown in FIG. 15, the counter 951 is reset by the horizontal synchronizing signal H and starts counting clock signals corresponding to pixels. The comparator 953 or 955 outputs a coincidence signal when the count value coincides with x1 or x2, respectively. As a result of this, the "x" enable signal 98, which is the output of the flip-flop circuit 956, behaves as depicted in FIG. 13 (A). Likewise the "y" enable signal 99, which is the output of the flip-flop circuit 966, behaves as illustrated in FIG. 13 (B). Upon receipt of the "x" enable signal 98 and "y" enable signal 99, the AND gate 97 generates the channel enable signal 101. As shown in FIG. 13 (C), the channel enable signal 101 designates a certain area of the screen defined by the parameters x1, x2, y1 and y2.

Figure 17:
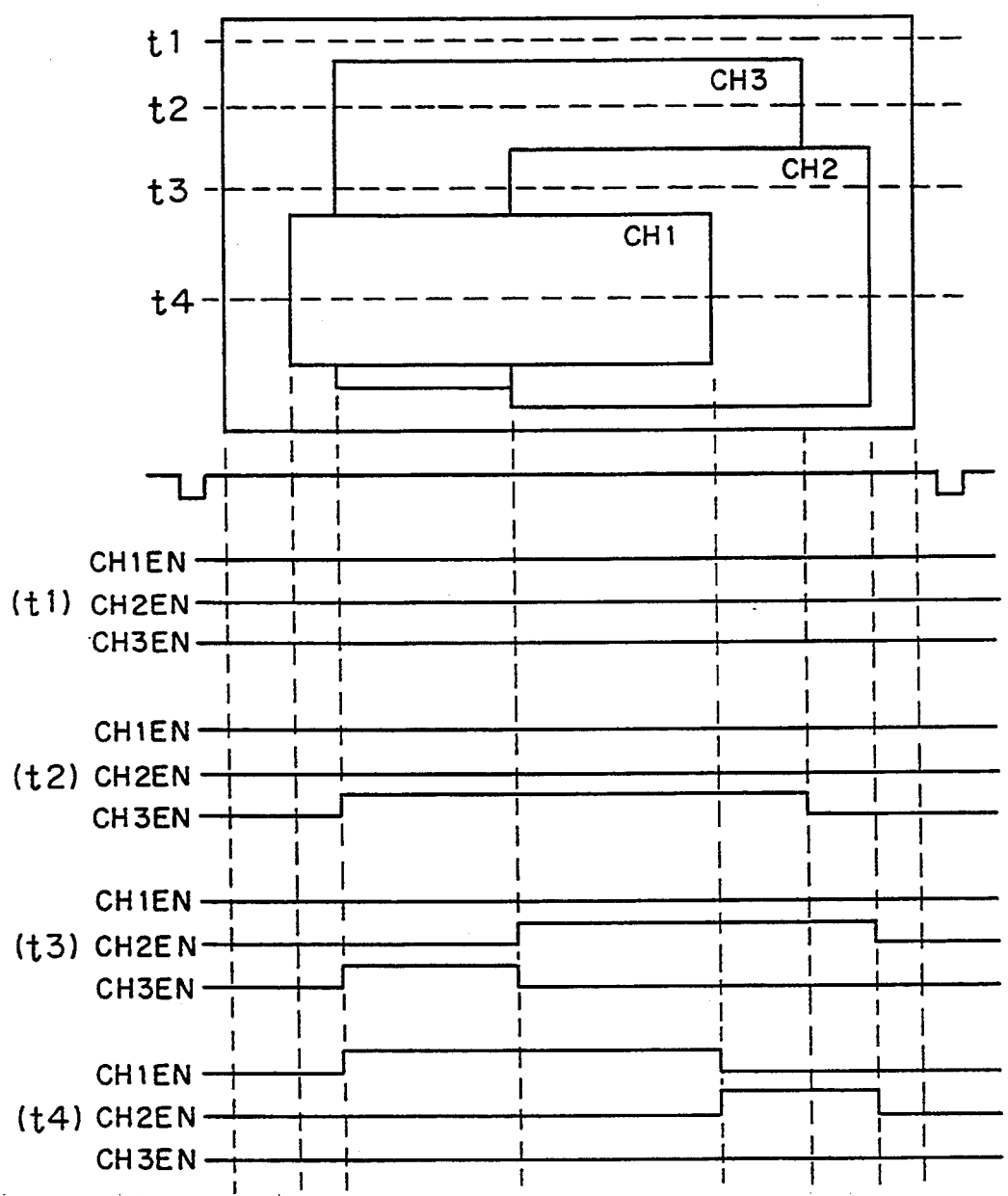
FIG. 17 is a view illustrating how channel enable signals behave in connection with the second embodiment.

The channel area designation signals 101, 102 and 103 are input to a channel priority discriminating circuit 94. The channel priority discriminating circuit 94 selects one of the channel area designation signals 101, 102 and 103 according to a given priority, and outputs the selected signal 101, 102 or 103 as a channel enable signal (CH1 EN stands for the signal on channel 1, CH2 EN for the signal on channel 2 and CH3 EN for the signal on channel 3 hereinafter). FIG. 17 shows how CH1 EN, CH2 EN and CH3 EN behave when channel 1 has the highest priority and channel 3 the lowest. The signals CH1 EN, CH2 EN and CH3 EN enter the data output circuits 60, 70 and 80, respectively, to become a signal allowing each data output circuit to output its data onto the data bus 13a. Thus data output from the data output circuits 60, 70 and 80 onto the bus 13 is carried out selectively. This makes it possible to display a plurality of screens on the display unit.

What follows is a description of how the data output circuit 60 operates when channel 1 is selected by the signal CH1 EN. The area generating circuit 614 outputs the area enable signal 64 in the same manner as the channel area generating circuit 91. The video priority signal generating circuit 613 outputs the video priority signal 63, which causes video data to be output preferentially. The period during which the video priority signal is output is to be set illustratively from the operator terminal 100. In that case, the AND gate 616 works as a three-state gate whose high impedance state is reset by the signal CH1 EN. The AND gate 616 outputs the digital data inhibit signal 65 when the area enable signal 64 and the video priority signal 63 are both set to 1. The digital data inhibit signal 65 passes through the OR gate 628 to become the first inhibit signal 66B, inhibiting the bus buffer 37 from effecting its output. Thus the output of the video priority signal 63 inhibits the output of digital data from the second memory 23 to the bus 13. The inverting gate 629 also works as a three-state gate whose high impedance state is reset by the signal CH1 EN. Thus the output of the OR gate 628 causes the inverting gate 629 to invert the digital data inhibit signal 65, the inverted signal becoming the second inhibit signal 66. At this point, the second inhibit signal 66 is inactive and places the bus buffer 33 into a conductive state. Therefore, the video data in the first memory 15 is output onto the bus 13. With the video priority signal 63 output at the desired timing, the image composition shown in FIG. 9 (B) is made possible.

If the video priority signal is set to 0, the bus buffers 33 and 37 are controlled by the output from the transparency discriminating circuit 40, as with the prior art setup of FIG. 7. Thus if the digital data output from the second memory 23 contains a transparent pixel, the video data in the first memory 15 is output onto the bus 13; if the digital data contains no transparent pixel, the digital data is output onto the bus 13. This makes it possible to superimpose the digital image onto the video image, as illustrated in FIG. 9 (C).

Figure 10:
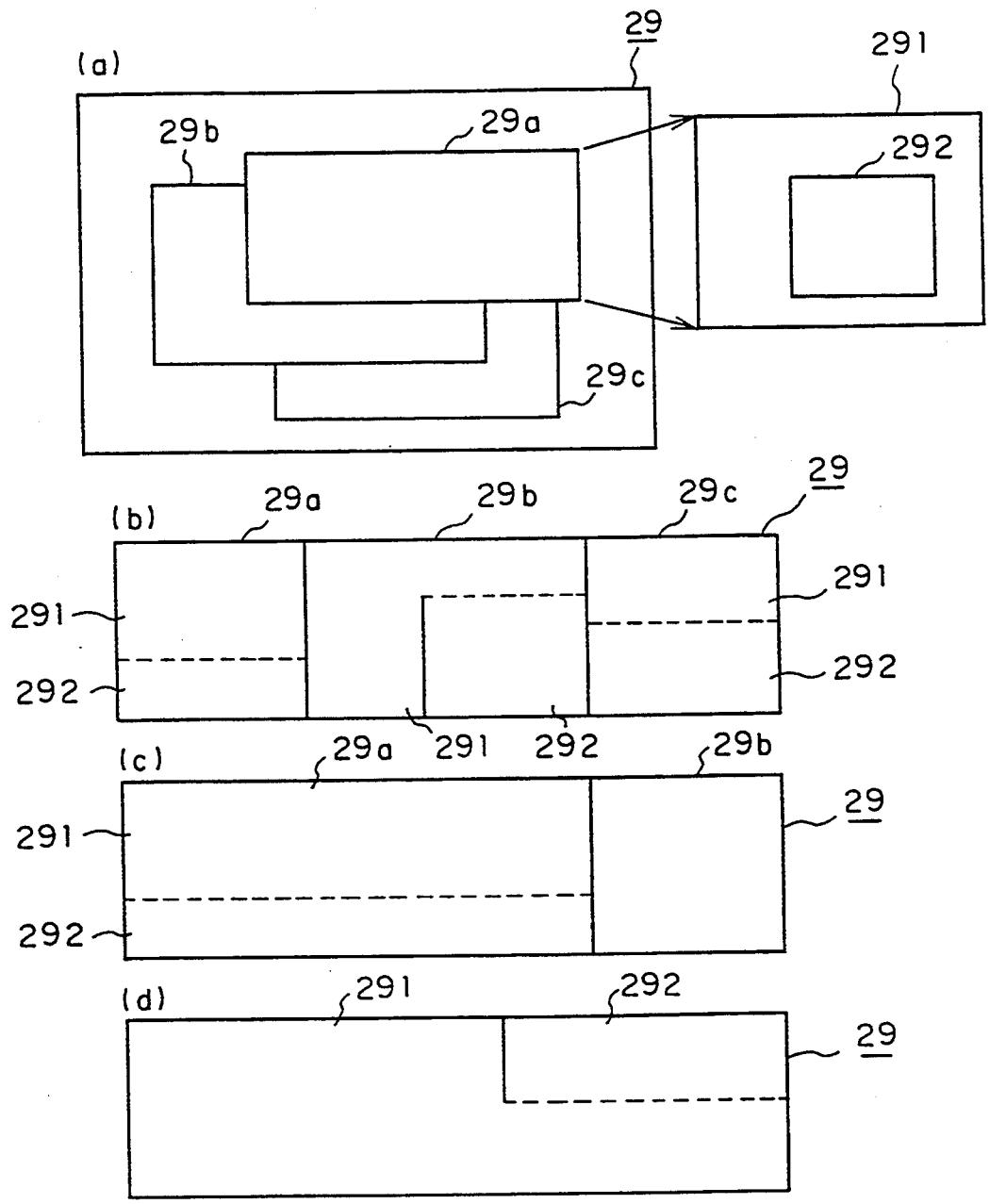
FIG. 10 is a set of views describing examples of composite images.

As described, the first inhibit signal 66B, the second inhibit signal 66, and the video priority signal 63 that switches the priority of these two signals combine to implement various displays of image composition involving video and digital images. The channel enable signal whose priority is higher than those of the two inhibit signals makes it possible to practice various displays depicted in FIG. 10. Because the display position of each channel is designated as desired by suitably setting parameters, varieties of display are made available, and transition between screens is carried out instantaneously without disturbing the display.

In the above-described embodiments, the storage elements assigned to the display unit 29 and connected to the bus 13 comprises latch circuits corresponding individually to the pixels of the screen. Alternatively, the storage elements may be a frame memory arrangement containing addresses corresponding to the pixels or may be some other similar storage means. In the display unit 29, each pixel is provided and driven independently. Alternatively, as with various so-called panel displays, the same kind of control is available in a dynamic drive scheme in which driving means is assigned to each of the rows and columns of pixels so as to control each pixel at each intersection point. The image output control apparatus as embodied above is not limited to usage with a large-screen display unit. The apparatus may be applied to many other kinds of display systems.

As described, the image output control apparatus according to the invention outputs video data onto the bus when the transparency discriminating circuit thereof detects digital data containing a transparent pixel and, using a video priority signal, preferentially outputs video data onto the bus. This arrangement implements; various displays of image composition and carries out instantaneous transition between screens without disturbing the display.

The priority discriminating means of the apparatus controls data output from a plurality of data output circuits. This arrangement reinforces the effects mentioned above and makes it easy to display a plurality of screens on a single display unit.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. An image output control apparatus comprising:
   a bus to which a display unit is connected and through which passes the data corresponding to images to be displayed on the screen of said display unit;
   a video data generating block for generating video data which is digitized and which corresponds to a video image to be displayed on said screen;
   a digital data generating block for generating digital data representing a digitized character and graphic image to be displayed on said screen; and
   a video priority signal generating circuit for outputting a video priority signal designating that said video data be preferentially output onto said bus;
   said video data generating block further comprising:
   an area generating circuit for outputting an area designation signal designating the area in which to display said video image on said screen;
   a digital data inhibit signal generating circuit for generating a digital data inhibit signal in response to the presence of both said area designation signal and said video priority signal; and
   a first inhibit circuit for inhibiting the output of said video data onto said bus in accordance with a second inhibit signal;
   said digital data generating block further comprising:
   a transparency discriminating circuit for checking to see if said digital data indicates any transparent pixel and, upon detecting a transparent pixel, for generating a transparency signal;
   an inhibit signal generating circuit for generating a first inhibit signal and said second inhibit signal in accordance with said digital data inhibit signal and said transparency signal; and
   a second inhibit circuit for inhibiting the output of said digital data onto said bus in accordance with said first inhibit signal.

2. An image output control apparatus according to claim 1, wherein said inhibit signal generating circuit makes said first inhibit signal active when at least either of said transparency signal and said digital data inhibit signal is active, and makes said second inhibit signal active when said first inhibit signal is inactive.

3. An image output control apparatus according to claim 2, wherein said video data generating block outputs the video data stored in a first memory onto said bus in accordance with a timing signal when said second inhibit signal is inactive; and
   wherein said digital data generating block outputs the digital data stored in a second memory onto said bus in accordance with said timing signal when said first inhibit signal is inactive.

4. An image output control apparatus according to claim 3, wherein:
   said digital data inhibit signal generating circuit further comprises an AND gate for AND'ing said video priority signal and said area designation signal and outputting the result therefrom;

said first inhibit circuit further comprises a bus buffer which is interposingly provided between said first memory and said bus and which is placed in a conductive state when said second inhibit signal is inactive;

said second inhibit circuit further comprises a bus buffer which is interposingly provided between said second memory and said bus and which is placed in a conductive state when said first inhibit signal is inactive; and said inhibit signal generating circuit further comprises an OR gate for OR'ing said transparency signal and said digital data inhibit signal and outputting the result therefrom as said first inhibit signal, and an inverting gate for inverting said first inhibit signal to generate said second inhibit signal.

5. An image output control apparatus according to claim 1, wherein said area generating circuit further comprises:

an "x" enable signal generating circuit for generating a horizontal enable signal;

a "y" enable signal generating circuit for generating a vertical enable signal; and an AND gate for AND'ing the output of said "x" enable signal generating circuit and that of said "y" enable signal generating circuit and outputting the result therefrom as said area designation signal.

6. An image output control apparatus according to claim 5, wherein said "x" enable signal generating circuit further comprises:

a first counter for counting clock signals in synchronization with pixels;

a first comparator for comparing a parameter indicating a horizontal display start position with the count value of said first counter;

a second comparator for comparing a parameter indicating a horizontal display end position with the count value of said first counter; and a flip-flop circuit which is set by a coincidence signal from said first comparator and is reset by a coincidence signal from said second comparator; and wherein said "y" enable signal generating circuit further comprises:

a second counter for counting clock signals in synchronization with pixels;

a third comparator for comparing a parameter indicating a vertical display start position with the count value of said second counter;

a fourth comparator for comparing a parameter indicating a vertical display end position with the count value of said second counter; and a flip-flop circuit which is set by a coincidence signal from said third comparator and is reset by a coincidence signal from said fourth comparator.

7. The image output control apparatus of claim 1, wherein said digital data inhibit signal generating circuit generates said digital data inhibit signal by performing a logical AND between said area designation signal and said video priority signal.

8. An image output control apparatus comprising:

a bus to which a display unit is connected and through which passes the data corresponding to images to be displayed on the screen of said display unit;

a plurality of data output circuits each containing a video data generating block for generating video data which is digitized and which corresponds to a video image to be displayed on said screen, and a digital data generating block for generating: digital data representing a digitized character and graphic image to be displayed on said screen;

a priority discriminating means for determining one of said plurality of data output circuits, said determined data output circuit being allowed to output data onto said bus; and a video priority signal generating circuit which is assigned to each of said data output circuits and which outputs a video priority signal designating that said video data be preferentially output onto said bus;

each of said video data generating blocks further comprising:

an area generating circuit for outputting an area designation signal designating the area in which to display said video image on said screen;

a digital data inhibit signal generating circuit for generating a digital data inhibit signal in response to the presence of both said area designation signal and said video priority signal; and a first inhibit circuit for inhibiting the output of said video data onto said bus in accordance with a second inhibit signal;

each of said digital data generating blocks further comprising:

a transparency discriminating circuit for checking to see if said digital data indicates any transparent pixel and, upon detecting a transparent pixel, for generating a transparency signal;

an inhibit signal generating circuit for generating a first inhibit signal and said second inhibit signal in accordance with said digital data inhibit signal and said transparency signal; and a second inhibit circuit for inhibiting the output of said digital data onto said bus in accordance with said first inhibit signal.

9. An image output control apparatus according to claim 8, wherein said priority discriminating means further comprises:

a channel area generating circuit which is assigned to each of said data output circuits and which generates a channel area designation signal designating the display area to be handled by the data output circuit assigned thereto; and a channel priority determining circuit for admitting each of said channel area designation signals and outputting a channel enable signal in accordance with the channel area designation signal selected based on a predetermined priority.

10. An image output control apparatus according to claim 9, wherein said channel area generating circuit further comprises:

an "x" enable signal generating circuit for generating a horizontal enable signal;

a "y" enable signal generating circuit for generating a vertical enable signal; and an AND gate for AND'ing the output of said "x" enable signal generating circuit and that of said "y" enable signal generating circuit and outputting the result therefrom as said channel area designation signal.

11. An image output control apparatus according to claim 10, wherein said "x" enable signal generating circuit further comprises:

a first counter for counting clock signals in synchronization with pixels;

a first comparator for comparing a parameter indicating a horizontal display start position with the count value of said first counter;

a second comparator for comparing a parameter indicating a horizontal display end position with the count value of said first counter; and a flip-flop circuit which is set by a coincidence signal from said first comparator and is reset by a coincidence signal from said second comparator; and wherein said "y" enable signal generating circuit further comprises:

a second counter for counting clock signals in synchronization with pixels;

a third comparator for comparing a parameter indicating a vertical display start position with the count value of said second counter;

a fourth comparator for comparing a parameter indicating a vertical display end position with the count value of said second counter; and a flip-flop circuit which is set by a coincidence signal from said third comparator and is reset by a coincidence signal from said fourth comparator.

12. An image output control apparatus according to claim 9, wherein said inhibit signal generating circuit makes said second inhibit signal active when at least either of said transparency signal and said digital data inhibit signal is active while said channel enable signal is being output; and wherein said digital data inhibit signal generating circuit makes said digital data inhibit signal active when said area designation signal and said video priority signal both become active while said channel enable signal is being output.

13. An image output control apparatus according to claim 12, wherein said video data generating block outputs the video data stored in a first memory onto said bus in accordance with a timing signal when said second inhibit signal is inactive; and wherein said digital data generating block outputs the digital data stored in a second memory onto said bus in accordance with said timing signal when said first inhibit signal is inactive.

14. An image output control apparatus according to claim 13, wherein:

said digital data inhibit signal generating circuit further comprises an AND gate which is enabled by said channel enable signal for AND'ing said video priority signal and said area designation signal and outputting the result therefrom;

said first inhibit circuit further comprises a bus buffer which is interposingly provided between said first memory and said bus and which is placed in a conductive state when said second inhibit signal is inactive;

said second inhibit circuit further comprises a bus buffer which is interposingly provided between said second memory and said bus and which is placed in a conductive state when said first inhibit signal is inactive; and said inhibit signal generating circuit further comprises an OR gate for OR'ing said transparency signal and said digital data inhibit signal and outputting the result therefrom as said first inhibit signal, and an inverting gate which is enabled by said channel enable signal for inverting said first inhibit signal to generate said second inhibit signal.

15. The image output control apparatus of claim 8, wherein said digital data inhibit signal generating circuit generates said digital data inhibit signal by performing a logical AND between said area designation signal and said video priority signal.

16. An image output control apparatus comprising:

first memory means for storing video image data;

second memory means for storing digital data;

video priority signal means for generating a logical high level signal if the video image data has priority for a pixel to be driven;

transparency discriminating means, responsive to said second memory means, for generating a logical high level signal if the digital data stored in said second memory means relating to said pixel is transparent; and control means, responsive to said first memory means and said video priority signal means, for driving said pixel based on video image data relating to said pixel stored in said first memory means if either of said video priority signal means or said transparency discriminating means generates a logical high level signal.

* * * * *